(12) United States Patent
Perin

(10) Patent No.: US 7,455,016 B2
(45) Date of Patent: Nov. 25, 2008

(54) EXPANDABLE WRITING PANEL FOR A VEHICLE CONSOLE

(75) Inventor: Douglas E. Perin, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 11/170,324

(22) Filed: Jun. 29, 2005

(65) Prior Publication Data
US 2007/0000959 A1  Jan. 4, 2007

(51) Int. Cl.
  A47B 88/00 (2006.01)
  A47B 95/00 (2006.01)
  A47B 23/00 (2006.01)
  A47B 37/00 (2006.01)

(52) U.S. Cl. .......................................... 108/44; 312/307

(58) Field of Classification Search .................... 108/33, 108/37, 40, 42, 44, 1–10, 47; 312/21, 28, 312/29, 30, 307, 304, 349, 350, 138.1, 139, 312/139.1, 139.2, 231, 305, 306, 312, 322, 312/323, 325; 248/441.1, 442.2, 447, 447.1, 248/454, 455, 456, 457, 458, 460, 461, 462, 248/463, 464, 465; 224/275, 484; 296/37.8
See application file for complete search history.

(56) References Cited

U.S. PATENT DOCUMENTS

| | | | | |
|---|---|---|---|---|
| 213,593 A * | 3/1879 | Sherwood | .................... | 297/163 |
| 483,669 A * | 10/1892 | Ganzlin | .......................... | 108/8 |
| 841,766 A * | 1/1907 | Campbell | ................ | 312/351.9 |
| 1,217,231 A * | 2/1917 | Soper | .......................... | 297/145 |
| 1,688,834 A * | 10/1928 | Sharp | ....................... | 312/235.3 |
| 1,887,102 A * | 11/1932 | Mathie | ......................... | 312/303 |
| 2,330,627 A * | 9/1943 | Reynolds | ..................... | 297/145 |
| 2,331,576 A * | 10/1943 | Siskin | .......................... | 312/29 |
| 2,358,041 A * | 9/1944 | Williams | ..................... | 312/231 |
| 2,565,845 A * | 8/1951 | Frederick | ..................... | 312/246 |
| 2,573,176 A * | 10/1951 | Blackstone | ................... | 281/44 |
| 2,740,471 A * | 4/1956 | Follett | .......................... | 160/32 |
| 2,797,739 A | 7/1957 | Orsini | | |
| 4,417,764 A * | 11/1983 | Marcus et al. | .......... | 297/188.17 |
| 5,372,403 A * | 12/1994 | Puerto | ................... | 297/188.17 |
| 5,381,738 A * | 1/1995 | Meyer | .......................... | 108/42 |
| 5,516,191 A | 5/1996 | McKee | | |
| 5,547,247 A * | 8/1996 | Dixon | .......................... | 297/145 |
| 5,671,686 A | 9/1997 | Hurley et al. | | |
| 6,032,587 A | 3/2000 | Salenbauch et al. | | |
| 6,139,096 A * | 10/2000 | Anderson et al. | ......... | 297/188.1 |

(Continued)

Primary Examiner—Janet M Wilkens
Assistant Examiner—Timothy M Ayres
(74) Attorney, Agent, or Firm—Rankin, Hill & Clark LLP; Mark E. Duell

(57) ABSTRACT

The present invention is directed to an expandable writing panel system for a vehicle, the system including a writing panel and a support leg wherein the support leg upper edge is hingedly attached to the writing panel. The expandable writing panel system also includes writing panel guide tracks and support leg guide tracks adjacent to the writing panel guide tracks. When in an unextended state, the writing panel fits within the console body and is configured adjacent to the support leg and both are generally vertical and, in an extended state, the writing panel guide tracks divert the lower edge of the writing panel away from the lower edge of the support leg and the writing panel into an angled orientation.

3 Claims, 5 Drawing Sheets

U.S. PATENT DOCUMENTS

| | | |
|---|---|---|
| 6,279,977 B1 | 8/2001 | Chen |
| 6,431,645 B2 * | 8/2002 | Massara et al. ............. 297/144 |
| 6,565,137 B1 | 5/2003 | Snook et al. |
| 6,793,281 B2 * | 9/2004 | Duerr et al. .................. 297/147 |
| 6,851,736 B1 | 2/2005 | Klopp, III et al. |
| 2002/0066392 A1 | 6/2002 | Calam et al. |
| 2005/0178297 A1 * | 8/2005 | Pipkin ......................... 108/25 |

* cited by examiner

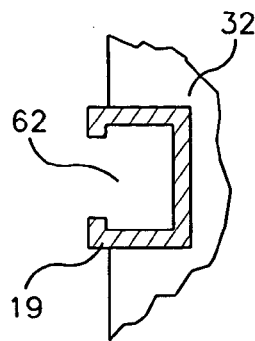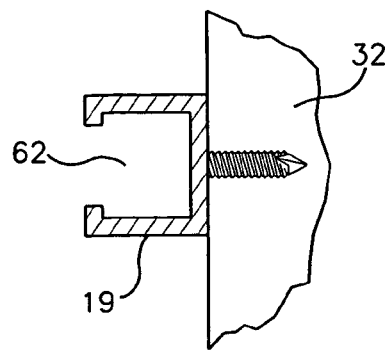
Figure 2a          Figure 2b
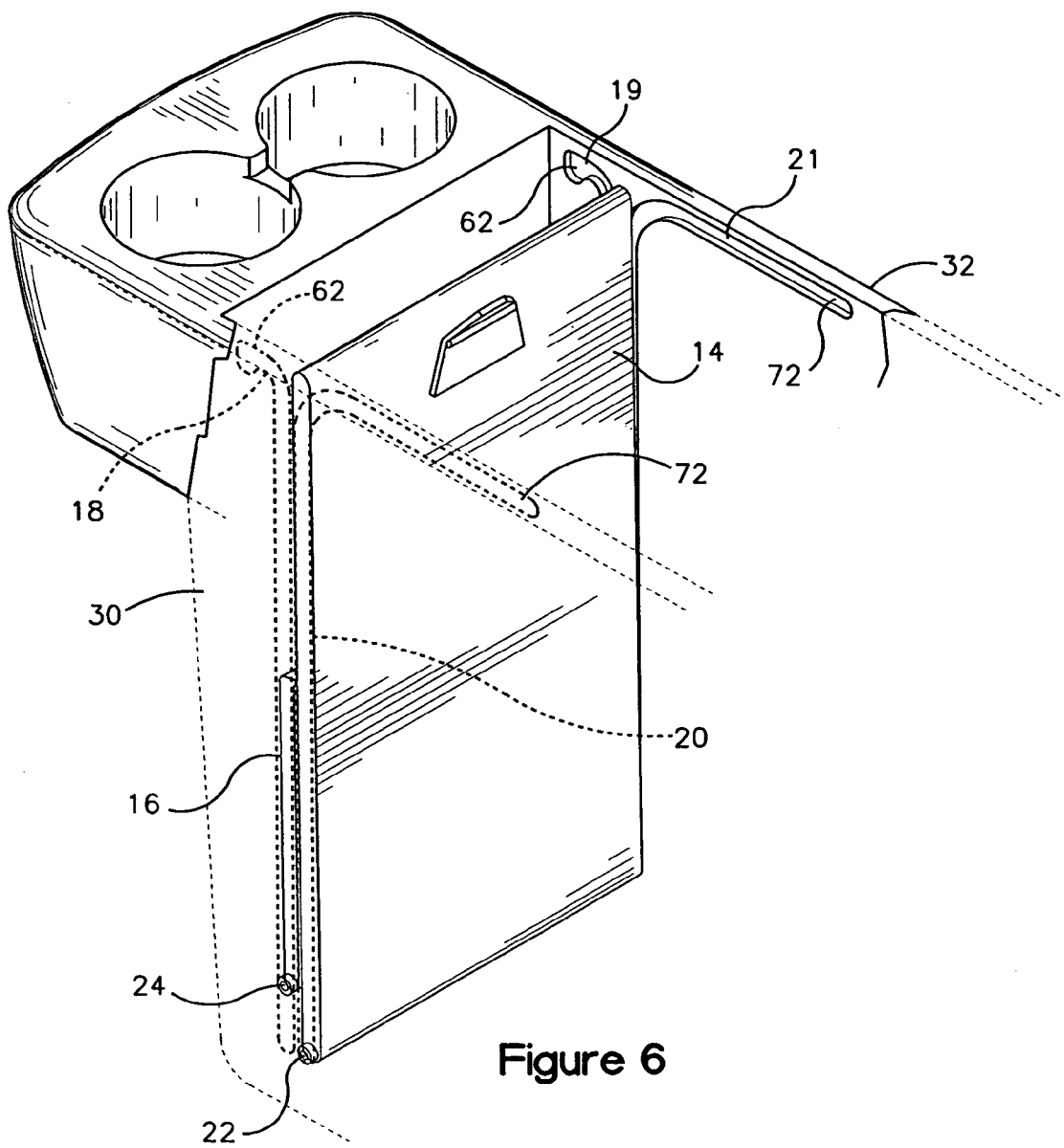
Figure 6

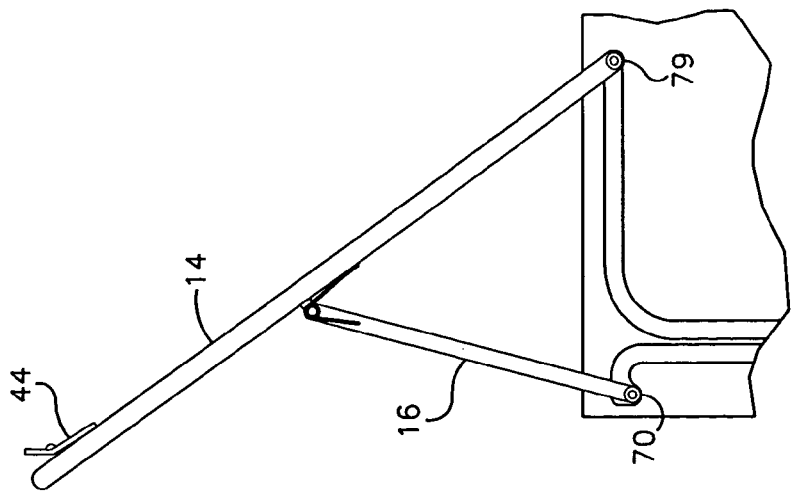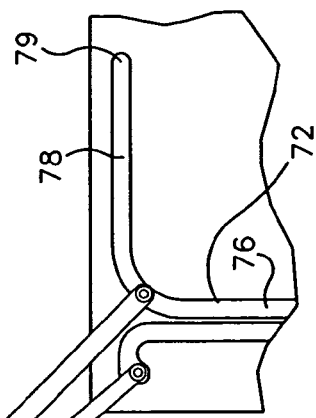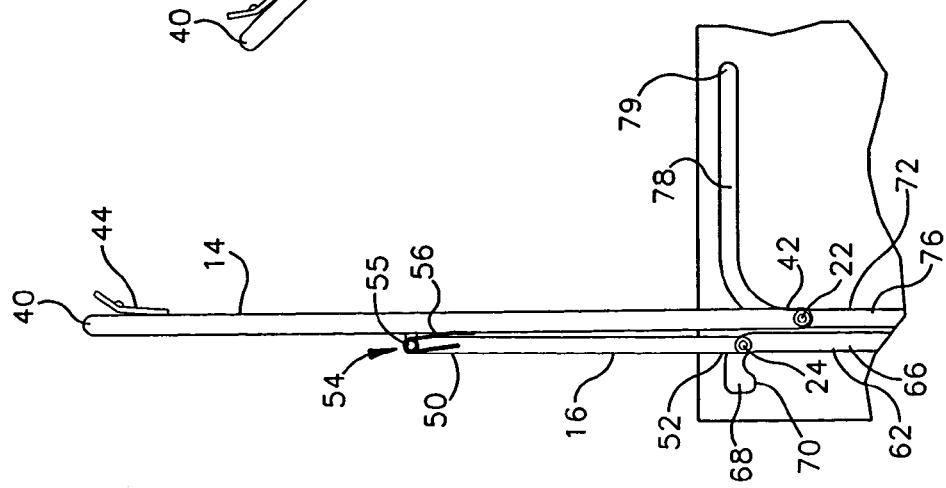

EXPANDABLE WRITING PANEL FOR A VEHICLE CONSOLE

BACKGROUND OF THE INVENTION

Storage space within modern vehicles is at a premium. One area within vehicles that has become more utilized is the center console, typically located between two front bucket seats. The size of the center console varies based on the size of the vehicle's passenger compartment. Because the center console space is easily accessible by the vehicle driver and thus, desirable, maximizing the amount of useful space in the center console is important. Space within the center console is especially useful for items that the driver uses while driving or otherwise seated in the driver's seat, such as change for tolls, cell phones, computer messaging devices, auxiliary music devices, and maps. The center console may also be beneficial for writing use, including the storage of pencils, pens and paper, the ability to view paper and maps while the vehicle driver is in the driver's seat, and the ability to write on these items.

U.S. Pat. No. 6,565,137 to Snook et al. discloses a center console assembly that includes a table disposed therein. A linear drive mechanism pushes a table assembly out from the interior of the center console at an angle and then aligns the table horizontally. The table assembly shown, however, utilizes all of the working area within the center console and as a result is undesirable. U.S. Pat. No. 5,671,686 to Hurley et al. discloses a writing table housed within a vehicle center console. The writing table is attached via a hinge to the center console at a forward end. The writing table is unfolded from a position over the center console toward the dashboard. However, this writing table is located at an extreme forward end of the console and also covers a large area of useful space in the center console when not in use.

U.S. Pat. No. 5,372,403 to Puerto discloses a writing table that can be withdrawn from an armrest. The writing table slides out from the armrest and can be completely retracted therein. When extracted from the armrest, the writing table may be tilted into an inclined position. However, the writing table prevents use of a large area of the console for other purposes. U.S. Pat. No. 6,032,587 to Salenbauch et al. discloses a folding table that can be pulled forward from a vehicle center console. Although the table is stored within the lid of the console and, thus, does not limit full use of the console, the table can not be moved from a horizontal position and as a result is not ergonomic for the driver while seated in the driver's seat.

What is desired is an easily accessible, simple and ergonomic writing table that takes up a minimum amount of storage area in a console when not in use.

BRIEF SUMMARY OF THE INVENTION

The present invention provides an improvement over the prior art by providing an expandable writing panel system that is simple to use and store and that takes up very little room within a center console or other vehicle console. A vehicle console includes a console body defined by a front wall, a rear wall, first and second spaced side walls, a base wall and a lid. Stored within the console is an expandable writing panel having an upper edge and a lower edge and a support leg having an upper edge and a lower edge. The support leg upper edge is hingedly attached to the writing panel. The expandable writing panel also includes writing panel guide tracks and support leg guide tracks adjacent to the writing panel guide tracks. When in an unextended state, the writing panel fits within the console body, adjacent to the support leg, both the writing panel and support leg are oriented generally vertical. In an extended state, the writing panel guide tracks divert the lower edge of the writing panel away from the lower edge of the support leg, thus, providing the writing panel with an inclined orientation.

The writing panel system takes up very little room when in a retracted state which is a significant improvement over the prior art.

BRIEF DESCRIPTION OF THE FIGURES

FIG. 2a is a detailed cross-sectional view of a first variation of a track and channel of a writing panel system;

FIG. 2b is a detailed cross-sectional view of a second variation of a track and channel of a writing panel system;

FIG. 3 is a side elevated view of an expandable writing panel system of the present invention in a first extended position;

FIG. 4 is a side elevated view of an expandable writing panel system of the present invention in a second extended position;

FIG. 5 is a side elevational view of an expandable writing panel system of the present invention in a fully extended position;

FIG. 6 is a perspective view of an expandable writing panel system of the present invention in a fully retracted position;

DETAILED DESCRIPTION OF THE INVENTION

Figure 1:
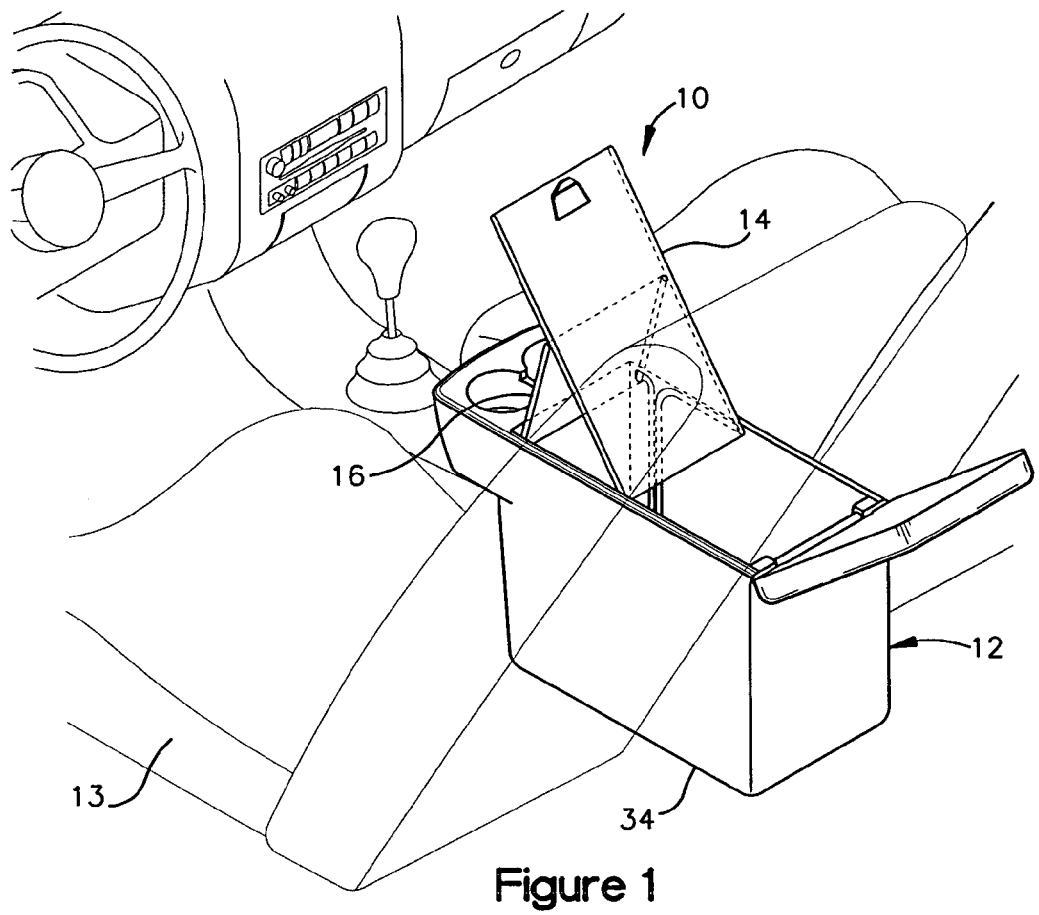
FIG. 1 is a perspective view of a passenger compartment of a vehicle including an expandable writing panel system of the present invention in a fully retracted position.

Referring to the FIGS. 1 and 6, an expandable writing panel system 10 for a vehicle console assembly 12 according to the present invention is illustrated. The expandable writing panel system 10 includes a writing panel 14, support leg 16, a pair of forward guide tracks 18 and 19, a pair of rearward guide tracks 20 and 21, a pair of writing panel guide pins 22 fixed to the writing panel 14 and a pair of support leg guide pins 24 fixed to the support leg 16. The guide pins 22 are slidably received within the guide tracks 20 and 21, and the guide pins 24 are slidably received within the guide tracks 18 and 19.

Figure 2:
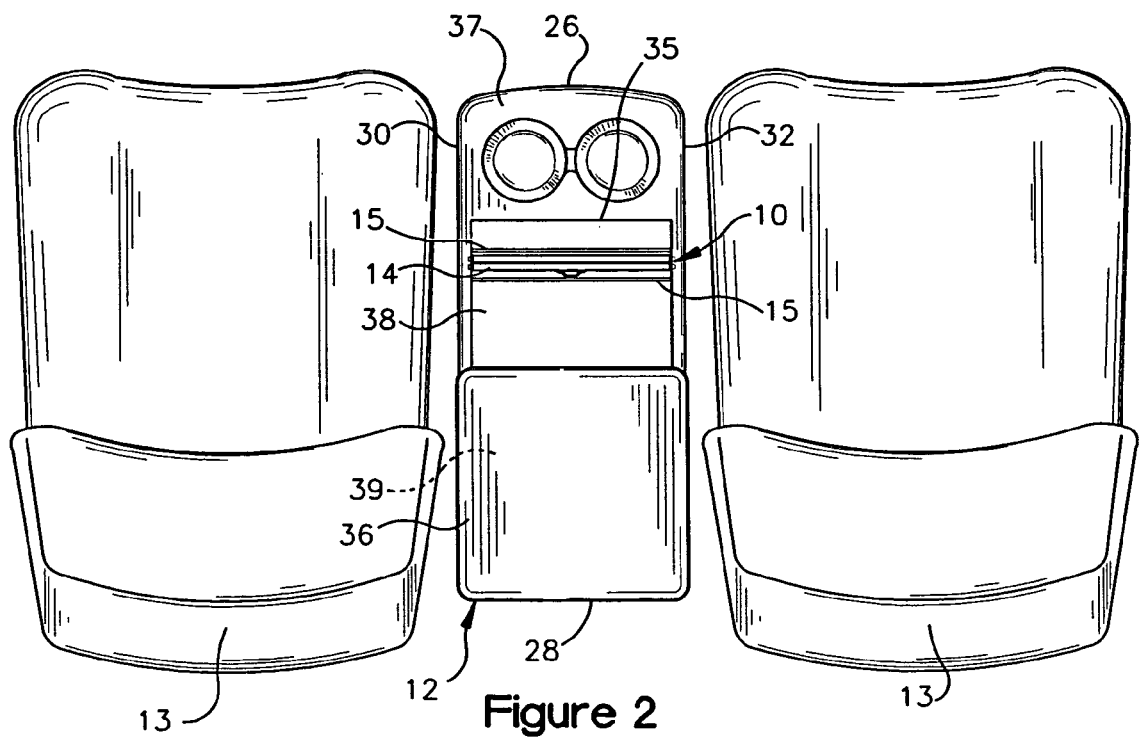
FIG. 2 is a top view of a passenger compartment of a vehicle including an expandable writing panel system.

The console 12 is used to secure items that vehicle occupants wish to access easily for storage in a preferred orientation. Such items include cell phones, personal digital assistants (PDA), a notebook computer, gloves, an ice scraper, MP3 player, beverage container, or change. Referring to FIG. 2, a center console 12 is located between two front bucket seats of a vehicle 13, as is well known in the art. Alternatively, a vehicle console 12 may be located between bucket seats in the rear of the vehicle or located flanking any seat in the vehicle. The console 12 has a generally rectangular shape and includes, generally, a front wall 26, a rear wall 28, first and second spaced side walls 30 and 32, a base wall 34, at least one internal dividing wall 35 that defines multiple storage spaces 37, 38, 39 and a lid 36 that covers at least one of the storage spaces.

The expandable writing panel system 10 is configured within a storage space 38 of the console 12 when not in use. The location of the expandable writing panel system 10 is preferably within a storage space 38 between a storage space 37 for beverage containers and a storage space 39 for change, but may be located anywhere along the length, front to rear, of the console 12. The expandable writing panel system 10 can function as a space divider within the console storage space 38 as described in more detail below. The writing panel 14 of the expandable writing panel system 10 is oriented perpendicular to the length of the console 12.

Figure 7:
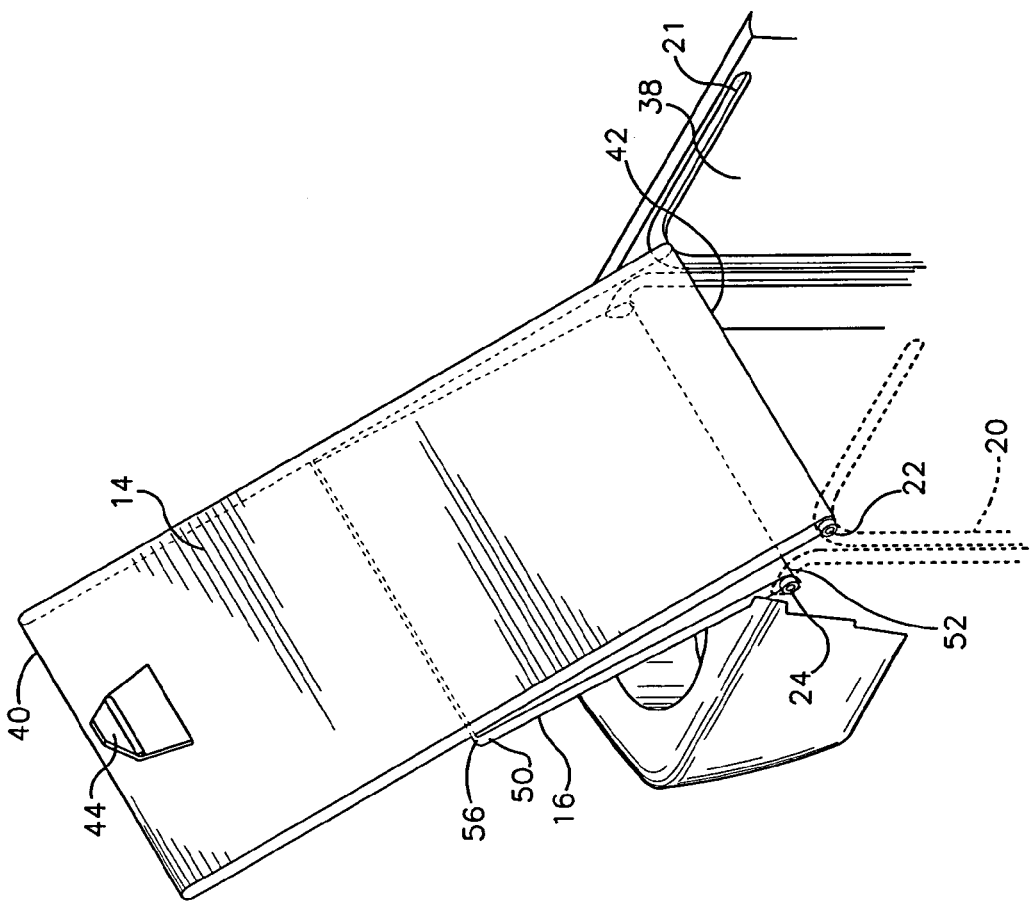
FIG. 7 is a perspective view of an expandable writing panel system of the present invention in a partially extended position.

The expandable writing panel system 10 includes a writing panel 14 that functions as a work surface for the vehicle driver or passenger. The writing panel 14 is flat and when in a use position, as shown in FIGS. 3 and 7, is inclined for easy viewing of, or writing on papers disposed thereon or attached thereto. The writing panel 14 includes an upper edge 40 and a lower edge 42. A clip 44 is attached to or formed within the upper edge 40 of the writing panel 14. The clip 44 clampingly secures papers or maps to the writing panel 14. The lower edge 42 includes pins 22 for securing the writing panel 14 to the writing panel guide tracks 20 and 21. Preferably, the pins 22 protrude from the sides of the writing panel 14 at the lower edge 42. To provide smoother movement of the writing panel 14 within the writing panel guide tracks 20 and 21, rollers may be used instead of pins 22.

Figure 8:
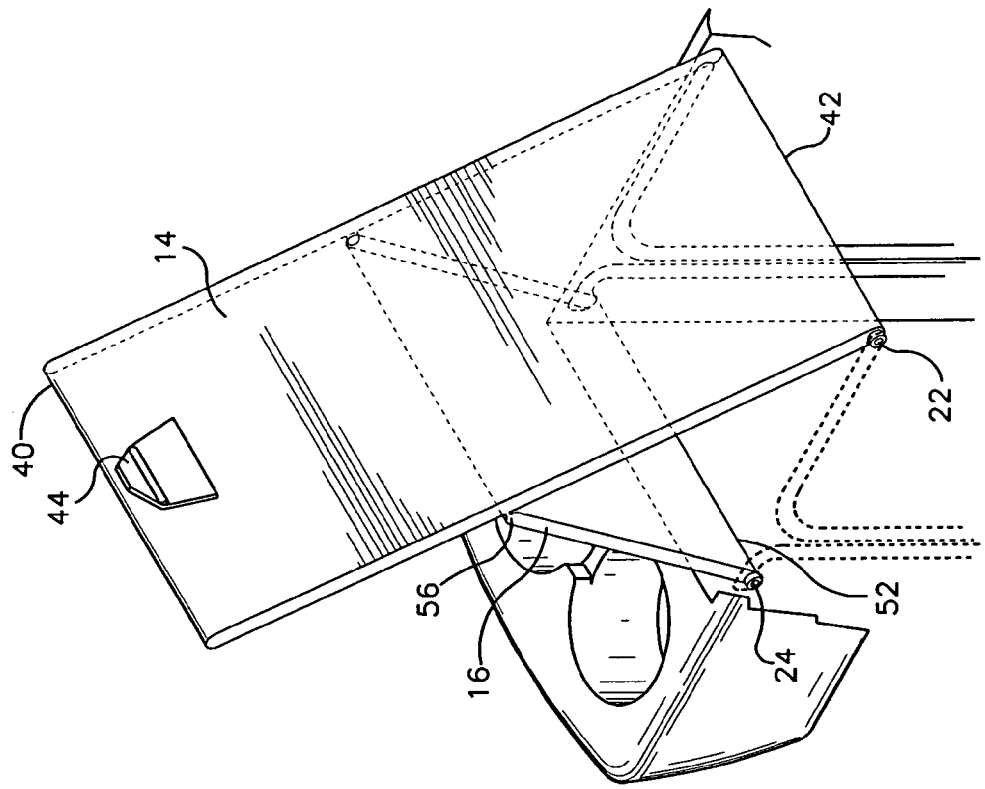
FIG. 8 is a perspective view of an expandable writing panel system of the present invention in a fully extended position.

The expandable writing panel system 10 also includes a support leg 16 that functions to support the writing panel 14 in an inclined position. The support leg 16 includes an upper edge 50 and a lower edge 52. The upper edge 50 of the support leg 16 is hingedly affixed to the writing panel 14. Preferably, the hinged connection 54 comprises a pin 55 on each side of the writing panel 14 that passes through the support leg 16 and allows relative rotational movement between the writing panel 14 and support leg 16. Preferably, a spring 56 is attached to the support leg 16 and writing panel 14 at the hinged connection 54. The spring 56 biases the support leg 16 and writing table 14 apart. This separating force assists the vehicle user in placing the writing table 14 into an inclined position, when desired. A pin type hinged connection 54 (FIGS. 3-5) may be replaced by a living hinge (FIGS. 6-8). A living hinge simply utilizes the elastic deformation properties of a polymer material to provide a structure where the writing panel 14 and support leg 16 force each other apart. The writing panel 14 and support leg 16 may be completely formed of a polymer or a polymer hinge may be attached to a non-polymer writing surface 14 and/or support leg 16. The support leg lower edge 52 includes pins 24 for securing the support leg 16 to the support leg guide tracks 18 and 19. Preferably, the pins 24 protrude from the sides of the support leg 16 at the lower edge 52. To provide smoother movement of the support leg 16 within the support leg guide tracks 18 and 19, rollers may be used instead of pins 24.

Referring to FIG. 2a, 2b and 6, the support leg guide tracks 18 and 19 are affixed to (FIG. 2b) or formed within (FIG. 2a) opposite side walls 30 and 32 of the console 12. A channel 62 is defined in each of the support leg guide tracks 18 and 19. Referring to FIG. 3, a first or lower section 66 of channel 62 is generally vertical. A second or upper section 68 of each channel 62 is continuous with, but is significantly shorter than the first section 66. The second section 68 is oriented perpendicular to the first section 66 and in a forward direction. At an end of the second section 68 opposite the junction with the first section 66, a seat 70 is provided. The seat 70 is a portion of the second section 68 with expanded dimensions on a lower side. The seat 70 functions as a resting place for the pins 24 in the support leg 16 when the writing table 14 is in an inclined position. The pins 24 will not easily pop out of the seat 70 unless the user is in the process of retracting the expandable writing panel system 10.

Referring to FIG. 6, the writing panel guide tracks 20 and 21 are positioned rearward of the support panel guide tracks 18 and 19 and also each define a channel 72 similar to the writing panel guide tracks 18 and 19. The support panel guide tracks 20 and 21 are affixed to or formed in opposite side walls 30 and 32 of the console 12, on the inner side of the side walls 30 and 32, and function to guide the writing panel 14 in a desired direction. Referring to FIGS. 3 and 4 a first or lower section 76 of each channel 72 is generally vertical. The lower section 76 of each channel 72 is parallel and adjacent to the lower section 66 of each channel in the support leg guide tracks 18 and 19. A second or upper section 78 of each channel 72 is continuous with the first section 76 and is oriented perpendicular to the first section 76 and in a rearward direction. The first section 76 is connected to the second section 78 through a gentle curve. A stop 79 is provided at the end of the second section 78 opposite the connection with the first section 76.

Referring to FIG. 2, the writing panel 14, in a retracted position, is housed between two barrier walls 15. The barrier walls 15 act as a divider between two storage areas within the storage area 38 of the console 12. When the writing panel 14 is extended and placed into an inclined position, the barrier walls 15 do not move. When the writing panel 14 is retracted within the console 12, the barrier walls 15 also help protect the writing surface 14 from damage.

Figure 9:
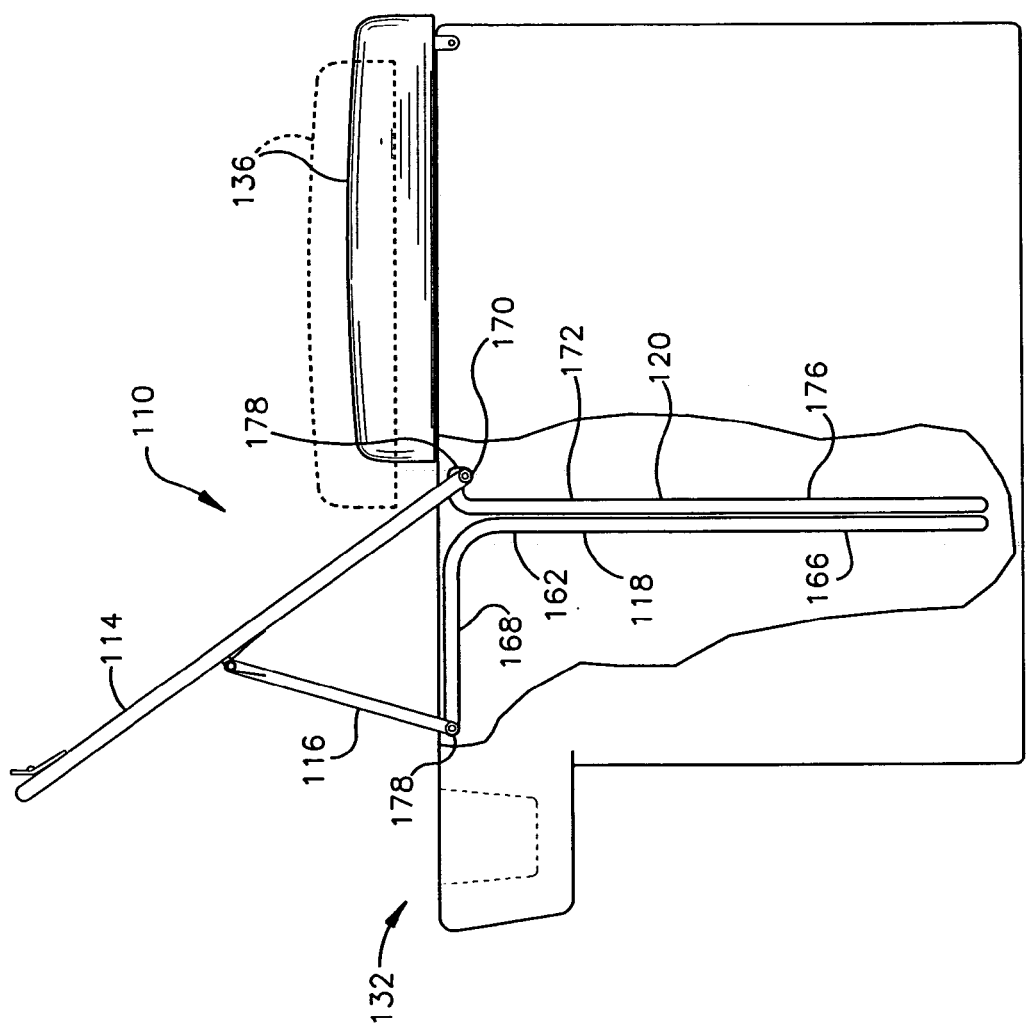
FIG. 9 is a side elevational view of an alternate embodiment of an expandable writing panel system.

Referring to FIG. 9, in an alternate embodiment of the expandable writing panel system 110, the configuration of the writing panel guide tracks 120 and 121 (not shown) and support leg guide tracks 118 and 119 (not shown) are reversed. The writing panel guide tracks 120 and 121 are to the rear of the support leg guide tracks 118 and 119. Specifically, the first or lower section 166 of each channel 162 of the support leg guide tracks 118 is generally vertical, but the upper section 168 is oriented perpendicular to the first section 166 and in a forward direction. The first or lower section 176 of each writing panel support track channel 172 is generally vertical and the upper section 178 is continuous with the first section 176 and is oriented perpendicular to the first section 176 and in a rearward direction. In this embodiment of the invention, the writing panel 114, in a retracted position, may be placed very close to the lid 136 of the console 132. The writing panel 114 can be extended and tilted into position without opening the lid 136 of the console 112.

In another embodiment of the invention shown in phantom lines, the writing panel guide track 120 is located directly below the console lid 136 and as a result, the writing panel 114 is partially or fully hidden from view when not in use. The lid must be raised during extension or retraction of the expandable writing panel system 110, but may be closed when the panel system 110 is fully extended. In any of the configurations described above the expandable writing panel system 110 can be located within a section of the console fully enclosed by the lid 136. When in such a location, in order to use the writing panel 114, the lid 136 must be kept in an open position.

Operation

Referring to FIGS. 3-5 and 6-9, the operation of the first embodiment of the invention is shown beginning with the expandable writing panel system 10 in its retracted position.

The user then grasps the writing panel 14 by the clip 44 or the panel's upper edge 40 adjacent to the clip 44 and pulls the writing panel 14 directly upward and outward from the storage area 38 of the console 12. As the pins 24 at the lower edge of the support leg 16 arrive at the uppermost point of the support leg guide tracks 18 and 19, the pins 22 in the writing panel 14 are entering the gentle curve of the writing panel guide tracks 20-21. The upper edge 40 of the writing panel 14 is then tilted forward at which time the pins 24 on the lower edge of the support leg 16 move into the seats 70 on the second section 68 of the support leg guide tracks 18 and 19. Force from the spring or living hinge 56 causes the pins 22 at the lower edge 42 of the writing panel 14 move to the stop 79 of the second section 78 of the writing panel guide tracks 20.

Once in place, maps and papers can be affixed to the writing panel 14 using the clip 44. Additionally or alternatively, cell phones, MP3 players, etc. can be clipped to the writing panel 14 utilizing clip 44 or a clip on the device itself. To place the writing panel 14 once more into storage, the upper edge 40 of the writing panel 14 is grasped and pulled backwards against the resistance of the spring 56 or live hinge. The bottom edge 42 of the writing panel 14 is, thus, brought together with the bottom edge 52 of the support leg 16. The writing panel 14 is then pulled upwards slightly to cause the pins 24 at the bottom of the support leg 16 to move out of the seats 70 and into the first section 66 of the writing panel guide tracks 18. The writing panel 14 is then pushed downward until the expandable writing panel system 10 is in a completely retracted position.

Referring to FIG. 9, the illustrated alternate embodiment of the expandable writing panel 110 is moved in a similar manner, except that the bottom edge 142 of the writing panel 114 rests in the seat 170 and the support leg 116 abuts the stop 179 when the writing panel 114 is in an extended position.

The present invention provides a significant advantage by providing a writing table system that fits within a vehicle console without taking up much room. The present invention also provides an embodiment where the console lid hides the expandable writing panel from view when in a retracted position.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A console with an expandable panel for a vehicle, comprising:
    a vehicle console body defined by a front wall, a rear wall, first and second spaced side walls, and a lid;
    a writing panel having a upper edge and a lower edge;
    a single support leg having an upper edge and a lower edge, the support leg upper edge pivotally attached to the writing panel;
    writing panel guide tracks, supporting opposite ends of the writing panel lower edge, the tracks being one of attached to or integral with the console; and
    support leg guide tracks, supporting opposite ends of the support leg lower edge, the tracks being one of attached to or integral with the console and adjacent to the writing panel guide tracks,
    wherein, in an unextended state, the writing panel fits within the console body and is configured adjacent to the support leg and both are generally vertical and, in an extended state, the writing panel guide tracks divert the lower edge of the writing panel away from the lower edge of the support leg, placing the writing panel into an inclined orientation,
    wherein the writing panel guide tracks each define a channel having continuous first and second sections configured perpendicularly and being connected by a gentle curve, and
    wherein the writing panel lower edge includes rollers that are slidingly received within the writing panel guide tracks and allow relative rolling movement, and the support leg lower edge includes rollers that are slidingly received within the support leg guide tracks and allow relative rolling movement.

2. The expandable panel of claim 1, wherein a first section of channel on the support leg guide tracks is parallel and adjacent to the first section of channel on the writing panel guide tracks.

3. A console with an expandable panel for a vehicle, comprising:
    a vehicle console body defined by a front wall, a rear wall, first and second spaced side walls, and a lid;
    a writing panel having a upper edge and a lower edge;
    a single support leg having an upper edge and a lower edge, the support leg upper edge pivotally attached to the writing panel;
    writing panel guide tracks, supporting opposite ends of the writing panel lower edge, the tracks being one of attached to or integral with the console; and
    support leg guide tracks, supporting opposite ends of the support leg lower edge, the tracks being one of attached to or integral with the console and adjacent to the writing panel guide tracks,
    wherein, in an unextended state, the writing panel fits within the console body and is configured adjacent to the support leg, and both are generally vertical and, in an extended state, the writing panel guide tracks divert the lower edge of the writing panel away from the lower edge of the support leg, placing the writing panel into an inclined orientation,
    wherein the support leg guide tracks each define a channel having continuous first and second sections configured perpendicularly and being connected by a gentle curve
    wherein the writing panel lower edge includes rollers that are slidingly received within the writing panel guide tracks and allow relative rolling movement and the support leg lower edge includes rollers that are slidingly received within the support leg guide tracks and allow relative rolling movement.

* * * * *